US008733846B2

(12) United States Patent
Mercat et al.

(10) Patent No.: US 8,733,846 B2
(45) Date of Patent: May 27, 2014

(54) SPOKE FOR A SPOKED WHEEL, METHOD OF MANUFACTURE THEREOF, AND WHEEL INCLUDING SUCH SPOKE

(75) Inventors: Jean-Pierre Mercat, Chavanod (FR); Julien Michaud, Cranves Sales (FR); Olivier Mouzin, Montmin (FR)

(73) Assignee: Mavic SAS, Metz-Tessy (FR)

( * ) Notice: Subject to any disclaimer, the term of this patent is extended or adjusted under 35 U.S.C. 154(b) by 1569 days.

(21) Appl. No.: 11/844,126

(22) Filed: Aug. 23, 2007

(65) Prior Publication Data

US 2008/0048487 A1 Feb. 28, 2008

(30) Foreign Application Priority Data

Aug. 25, 2006 (FR) ...................... 06 07517

(51) Int. Cl.
*B60B 1/00* (2006.01)
(52) U.S. Cl.
USPC ............................. 301/104; 301/55
(58) Field of Classification Search
USPC ........................ 301/55, 58–59, 104
See application file for complete search history.

(56) References Cited

U.S. PATENT DOCUMENTS

| 458,411 | A | * | 8/1891 | Bettendorf | 301/104 |
|---|---|---|---|---|---|
| 703,029 | A | * | 6/1902 | Wilske | 301/104 |
| 1,777,711 | A | | 10/1930 | Baker | |
| 4,226,478 | A | * | 10/1980 | Brown | 301/104 |
| 4,729,605 | A | | 3/1988 | Imao et al. | |
| 5,110,190 | A | | 5/1992 | Johnson | |
| 6,224,165 | B1 | | 5/2001 | Mercat et al. | |
| 6,848,752 | B1 | * | 2/2005 | Tien | 301/59 |
| 7,357,460 | B2 | * | 4/2008 | Schlanger | 301/104 |
| 7,434,891 | B2 | * | 10/2008 | Tien | 301/58 |
| 2004/0227394 | A1 | | 11/2004 | Chen et al. | |
| 2007/0040444 | A1 | * | 2/2007 | Fioravanti | 301/104 |
| 2007/0057566 | A1 | * | 3/2007 | Cappellotto | 301/58 |

FOREIGN PATENT DOCUMENTS

| EP | 0 165 590 A2 | 12/1985 |
|---|---|---|
| EP | 0 818 328 A1 | 1/1998 |
| FR | 2 586 378 A1 | 2/1987 |
| FR | 2 900 869 A1 | 11/2007 |
| GB | 20281 A | 0/1908 |
| GB | 27835 A | 0/1914 |
| GB | 29675 A | 0/1913 |
| GB | 104501 A | 8/1917 |
| GB | 211218 A | 2/1924 |
| JP | 60-033101 A | 2/1985 |
| JP | 60-080901 A | 5/1985 |
| WO | WO-91/13771 A2 | 9/1991 |

* cited by examiner

*Primary Examiner* — Jason Bellinger
(74) *Attorney, Agent, or Firm* — Greenblum & Bernstein, P.L.C.

(57) ABSTRACT

The invention relates to a spoke for a spoked wheel. The spoke has an elongated body and a separate attached end piece on at least one of its ends. The elongated body is tubular and its end is fitted in a recessed bore of the end piece. The end piece is assembled by gluing. In addition, a plug blocks each end of the tubular body to force the glue to creep back while the end piece is being fitted. The invention also relates to a wheel and to a method for manufacturing the spoke.

35 Claims, 4 Drawing Sheets

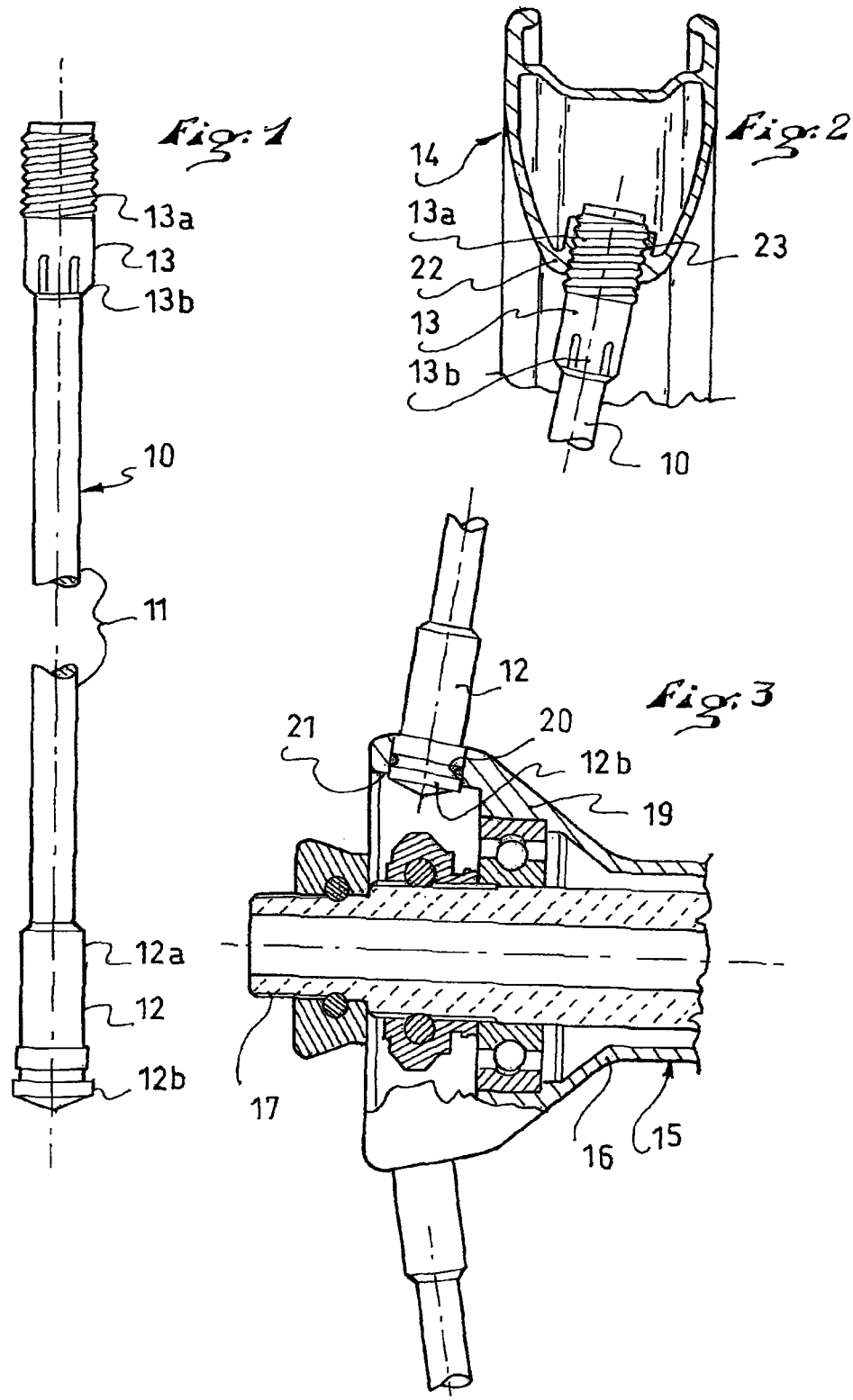

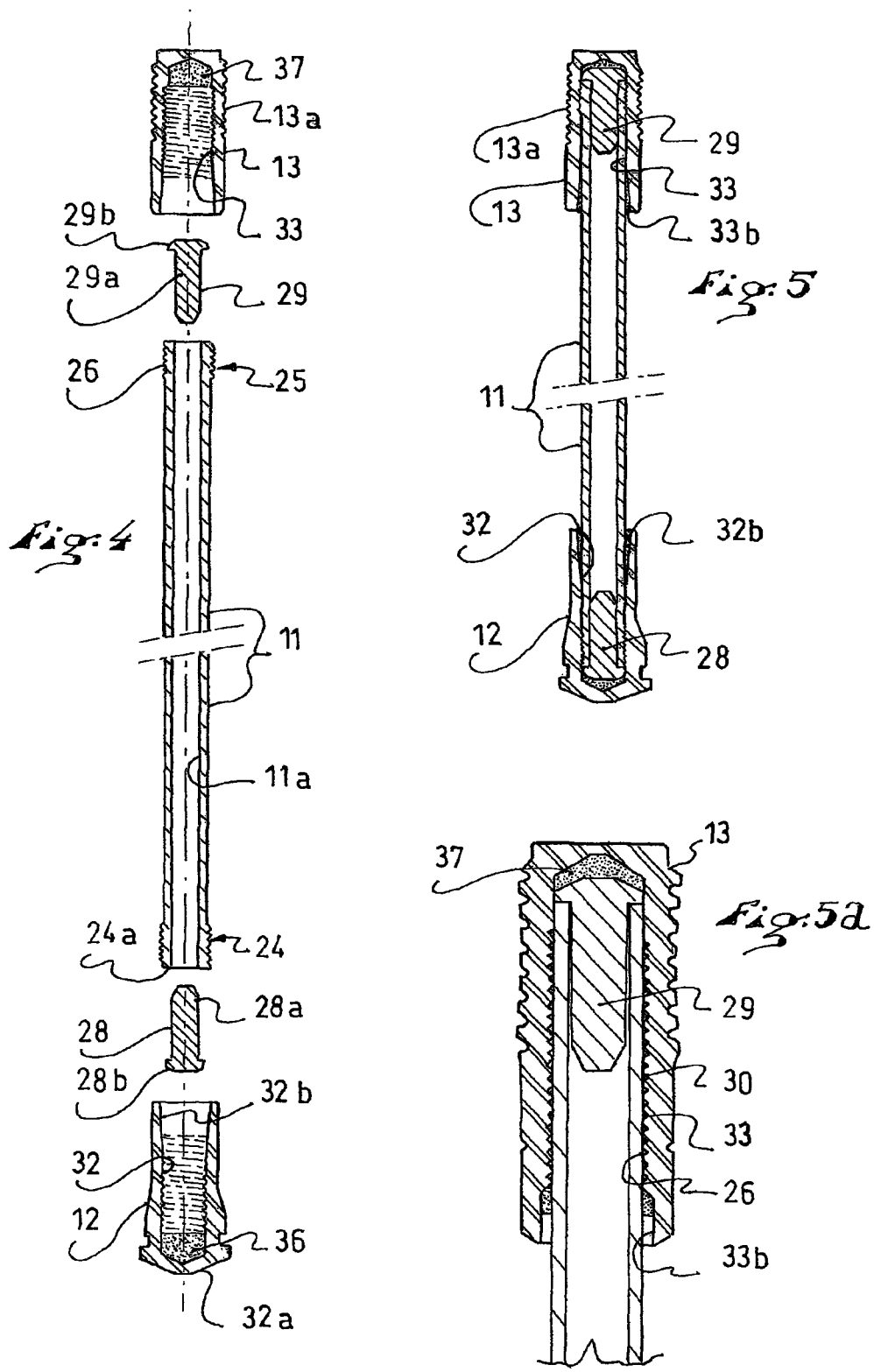

SPOKE FOR A SPOKED WHEEL, METHOD OF MANUFACTURE THEREOF, AND WHEEL INCLUDING SUCH SPOKE

CROSS-REFERENCE TO RELATED APPLICATION

This application claims priority under 35 U.S.C. §119 of French Patent Application No. 06.07517, filed on Aug. 25, 2006, the disclosure of which is hereby incorporated by reference thereto in its entirety.

BACKGROUND OF THE INVENTION

1. Field of the Invention

The invention relates to a spoke for a spoked wheel. It also relates to its method of manufacture and to a wheel equipped with at least one such spoke.

2. Description of Background and Other Information

Conventionally, each of the spokes of a spoked wheel include an elongated body and, at opposite ends of the body, a head end and a fastening end, allowing the tension of the spoke to be adjusted. Conventionally, such spokes are made of metal, although spokes are also known to be made of composite material which provides the advantage of relative lightness and increased strength.

The patent document WO 91/13771 and U.S. Pat. No. 5,110,190 disclose such a spoke formed of synthetic fibers having a high modulus of elasticity.

The patent documents FR 2 586 378, EP 165 590, and JP 60080901 disclose composite spokes whose body is made of synthetic fibers embedded in a resin matrix. An end piece, generally metallic, is attached to each end of the body to form the spoke head and the fastening end. The assembly between the body and the end pieces is carried out by gluing or crimping. Using composite material for the body of the spoke makes it possible to reduce the weight while maintaining the desired mechanical properties (rigidity, fatigue-strength).

However, these methods of construction are not entirely satisfactory. In order to reduce the weight of the spoke, and because of the material used, the body cross section has a reduced diameter, such as, for example 2 millimeters (mm) or about 2 mm. Under these circumstances, the assembly between the body and the end pieces lacks sturdiness. Indeed, due to the narrow cross section of the body, the surface area between these elements is also small. The surface area could be extended to increase its size, which would however negate the desired lightness since this would augment the size of the metal end pieces, which are heavier. Further, extending the gluing surface is, from a practical standpoint, not sufficient to withstand the stresses once the spoke is tensioned. In the embodiment shown in EP 165 590, the constituent fibers of a spoke are small in diameter and, therefore, have a low resistance to shearing and torsion. This results, most of the time, in the spoke breaking when tensioned due to the frictional torque generating the torsion.

In view of this state of the art, there is a need for a spoke that is improved to provide a sturdier assembly between the body and the end pieces.

SUMMARY OF THE INVENTION

The invention provides a light and mechanically-strong spoke.

The features of the spoke of the invention will become apparent from the description that follows.

The spoke of the invention has an elongated body and an attached end piece on at least one of its ends. The elongated body is tubular, and its end is fitted in a closed boring of the end piece.

According to the method for manufacturing a spoke according to the invention, at least one attached end piece is assembled to the end of the tubular body; the end of the tubular body is blocked by means of a plug; a bore is formed in the end piece, glue is applied to the bore and/or to the end of the tubular body, and the bore of the end piece is fitted onto the end of the tube.

The use of a tubular spoke body, which has therefore a larger diameter or outer cross section larger than a conventional spoke, substantially increases the contact surfaces between the body and each end piece, which provides for a sturdier assembly.

BRIEF DESCRIPTION OF THE DRAWINGS

The invention will be better understood from the following description, with reference to the attached drawings, and in which:

FIG. 1 shows a spoke according to a first embodiment of the invention;

FIGS. 2 and 3 show the fastening of the spoke of FIG. 1 to the rim and to the hub, respectively;

FIG. 4 is a cross-sectional exploded longitudinal plan view, showing various elements of the spoke of FIG. 1;

FIG. 5 shows a longitudinal cross-section of the various assembled elements;

FIG. 5a is a detailed view of a portion of the spoke of FIG. 5 according to another embodiment of the invention;

DETAILED DESCRIPTION OF THE INVENTION

Figure 6:
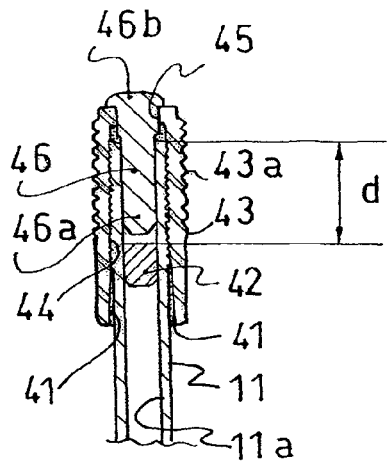
FIG. 6 relates to a further alternative construction.

The spoke 10 shown in FIG. 1 is a straight spoke, which comprises an elongated body 11 and, at each end of the body, the lower end 24 and the upper end 25, respectively, and end pieces 12, 13 that extend in the direction of the prolongation of the spoke body. According to the illustrated embodiment, the end piece 12 has a main portion 12a having an enlarged head 12b. The end piece 13a has, at a first end, an externally threaded portion 13a, which enables the tension of the spoke to be adjusted, and, at the other end located on the side of the body, a coupling portion 13b, provided to enable the coupling of a tension-adjustment tool. The cross-sectional dimensions of the head 12b are greater than the cross-sectional dimensions of the end piece 13. The cross sections of the coupling portions 12a, 13b of the end pieces are complementary to those of the body 10 and are attached and affixedly fastened to the ends of the body. This is described in more detail below.

FIGS. 2 and 3 show, by way of example, one form of assembly of the spoke 10 to a rim 14 and a hub 15, respectively. The hub 15 has a hub body 16 mounted on a shaft 17 or axle. Each spoke is fastened to a bulb 19, or flange, of the hub located at one end of the hub body. The bulb 19 is outwardly flared open and is provided at its periphery with holes, such as the illustrated hole 20. Each of the holes forms a housing 21 for retaining the head 12b of the end piece 12. Each spoke is positioned within a hole 20 before the shaft 17 is mounted and retained by its head 12*b*. Other constructional arrangements can be provided in the bulb within the scope of the invention, although they are not further described in detail.

The rim 14 has the same structure as the one disclosed, particularly in FIG. 13, in the patent document EP 818 328 and U.S. Pat. No. 6,224,165, the latter being hereby incorporated by reference thereto in its entirety. The rim 14 has a box-shaped structure, its lower bridge 22 being pierced with chimney-shaped openings such as the opening 23 that is shown. Each opening 23 is internally threaded to enable the portion 13*a* of the end piece of a spoke to be screwed therein. Screwing the end piece 13 in the housing 23 with a tool coupled to the portion 13*b* allows the tension of the spoke to be adjusted. Because the end pieces are affixed to the body of the spoke, the entire spoke turns around itself during this operation. To facilitate the rotation of the spoke, the area of the head 12*b* can be lubricated, for example with a low-friction material such as Teflon® applied by pulverization or with any other lubrication means. Other modes of construction are also possible.

A one-piece construction of the body and end pieces of a spoke is advantageous in that there are no movable pieces and in that the manufacture is simplified (especially with respect to assembly, painting, and/or other aspects of such manufacture). In addition, the spoke does not have a reduced cross-sectional zone in the area of the head and is therefore stronger where it is fastened to the rim.

FIGS. 4 and 5 show the structure of the parts of the spoke 10 in detail. The body 11 is tubular and comprises an inner surface 11*a*. According to the illustrated embodiment, the body 11 of the spoke is formed by a cylindrical tube. The tube is made of any appropriate metal or metallic alloy, or of a composite material. In a particular embodiment, the tube is made of carbon fibers and/or Kevlar® (aramid fiber), or glass fibers embedded in a resin matrix. Any appropriate resin can be used according to the invention, particularly an epoxy or polyester resin. For example, an elongated tube made of carbon fibers can be made by means of a pultrusion technique and then cut into sections of the desired length. The fibers can be oriented along the longitudinal direction defined by the body. They can also be criss-crossed and obliquely oriented relative to the longitudinal direction, such as, in particular, at a 45-degree angle. Criss-crossing the fibers improves the torsional strength of the spoke body by reducing, however, its longitudinal rigidity. Carbon has a high modulus of elasticity and a low density compared to a metallic alloy such as stainless steel or an aluminum alloy. In its composite form, it is very rigid in tension and in compression and is also very light weight.

The tubular body can also be made of light-weight metal, in particular an aluminum alloy. For example, it could be formed from an extruded pipe, heat-treated then cut into sections of the desired length. Depending upon the material used, the extruding operation can be followed by a cold-drawing operation to reduce the thickness of the wall of the tube. The tubular body can also be made by rolling and welding together a laminated sheet.

The cross section of the body 11, i.e., the width or diameter, is larger than that of a conventional spoke. By way of example, the tube, which forms the body, has a 4-millimeter outer diameter and a wall thickness comprised between 0.5 and 1.0 mm. Thus, the inner diameter of the body of the spoke, in such example, is at 3.0 mm. By comparison, a conventional spoke made of stainless steel has a thread diameter on the order of 2 mm. The cross section of the body is, in such case, circular, which is non-limiting, and other cross-sectional shapes are possible within the scope of the invention, whether closed or open.

The cross section of the body 11 is larger than that of a conventional spoke. By way of example, the tube, which forms the body, has a 4-millimeter outer diameter and a wall thickness comprised between 0.5 and 1.0 mm. By comparison, a conventional spoke made of stainless steel has a thread diameter on the order of 2 mm. The cross section of the body is, in such case, circular, which is non-limiting, and other cross-sectional shapes are possible within the scope of the invention, whether closed or open.

The length of the tube of the spoke body 11 is determined as a function of the length of the spoke 10, taking into account the end pieces. According to a particular embodiment according to the invention, however, the tube 11 is cut to a length that is slightly less than this theoretical length, that is, about 0.7 mm less than this length to make it possible to adjust precisely the length of the spoke by adjusting the position of the end piece at the end of the body. In the illustrated example, the outer wall of the body 11 is striated or provided with an uneven surface 26 on the two end portions 24 and 25. It can also be smooth. In the example shown in FIG. 4, the striae are made of circular grooves 26, but could alternatively be helical grooves. These striae can be broken or unbroken. They can alternatively have any other shape and be achieved by machining, sanding, sand blasting, etc., the importance of this feature being to form a surface having unevenness, i.e., irregularities.

Plugs 28, 29 are provided to block the ends of the tubular body 11. According to the embodiment shown, each plug, in particular the plug 28, has a body 28*a*, which is provided to extend within the inner surface 11*a* of the body, and a shouldered head 28*b*, which rests against the surface 24*a* of the lower end 24 of the body. Other modes of construction are also suitable, particularly if the plug hermetically blocks the end of the body, which is ensured as long as the plug is firmly kept in place, which is accomplished with glue which is added afterwards for such purpose, as described below. The plug 29 has an identical construction as that of the plug 28, with a body 29*a* and a shouldered head 29*b*, although the plug too could have a different construction.

The plugs are made of any appropriate material, for example a plastic material, the plugs being injection-molded.

The end pieces 12 and 13 are provided to be fitted on the end portions 24 and 25 of the body and assembled to these portions by gluing. To this end, the end pieces can be made of aluminum alloy. Indeed, it is known that gluing a carbon fiber composite onto aluminum is particularly strong. In the present embodiment, a tractional strength can be achieved on the order of 3,500 to 5,000 Newtons during use.

To allow for fitting and gluing, each end piece 12, 13 has a interior cavity 32 and 33, respectively, which opens out onto the side opposite the head 12*b* for the end piece 12, and opposite the threaded end 13*b* for the end piece 13. The two cavities, or bores 32, 33, are similar, only the bore 32 being described further in this regard.

The bore 32 is closed and, in this case, it is recessed. The depth of the recess, or cavity, is slightly less than the length of the end piece. Each of the plugs 28, 29 has an outer end that is contained within the closed interior cavity of the respective end pieces 12, 13, when the end pieces are fitted onto the end portions 24, 25 of the body of the spoke. The expression "outer end" or "outermost end" is intended to refer to the end of a plug that is outermost toward, or with respect to, the longitudinal end of the spoke body. In the illustrated embodiment, the bore 32 has a bottom portion 32*a* whose cross-sectional diameter is adjusted to the outer diameter of the end 24 of the tube, with a clearance adapted for receiving glue and, toward its opening, a slightly flared inlet 32b, that is, in the illustrated embodiment, the inlet is flared outwardly at approximately 5 degrees with respect to the longitudinal axis of the bore. Thus, at the bore inlet, an enlarged space 32b is provided between the walls of the bore 32 and of the body 11. This 5-degree value is, however, non-limiting and must be considered as an order of magnitude. The space 32b can also be demarcated by a cylindrical enlargement rather than a conical enlargement, or by another shape of the wall of the bore 32.

FIG. 5a shows in detail an embodiment of the end piece 13 in which a generally cylindrical enlarged space 33b is provided at its inlet in order to accommodate the glue.

The wall of each bore 32, 33 is striated over at least a portion of its length. In the illustrated embodiment, the striae 30 are unbroken and helical, meaning, they form a kind of internal screw thread.

When the end pieces are mounted on the end portions of the body, a drop of glue 36, 37 is applied to the bottom of each one of the bores. Any appropriate glue can be used, such as, for example, a two-component epoxy glue, such as Loctite® 9394, or an acrylic glue, cyanoacrylate, or a methacrylate-ester-based anaerobic resin. The quantity of glue, according to a particular embodiment, can be apportioned precisely so as to fill the space between the body 11 and each bore 32, 33 of the end pieces 12, 13. Also, the striated or uneven zone is deep enough in each bore so as to enable the glue to partly impregnate this zone and circulate in the striae when the end piece is fitted.

The assembly operation is carried out as follows. After the ends of the body 11 have been blocked with the plugs 28 and 29, the end pieces 12 and 13 with a drop of glue applied to the bottom of their respective bores are fitted onto the end portions 24, 25 of the body. Once the heads of the plugs 28, 29 come into contact with the glue, the glue is forced to creep. It creeps through the striated zone of each bore, then through the inlet zones 32b, 33b of the bores to fill the entire space between the bores of the end pieces 12, 13 and the wall of the body 11, including at least a portion of the enlarged space 32b, 33b. The striae 26 of the end portions 24, 25 of the body 11 facilitate the circulation and mechanical fastening of the glue. Generally speaking, the striae 26, 30 also augment the gluing surface area between the body 11 and the end pieces 12, 13.

The end pieces 12, 13 are aligned on the longitudinal axis of the body by the contact of their respective bottom zones, 32a for the end piece 32, with the wall of the body 11.

The precise length of the spoke is adjusted by the distance between the two end pieces 12, 13 during the curing/hardening of the glue. It is for this reason that the body 11 is cut short of its theoretical length to make it possible to adjust precisely the position of the end pieces 12, 13 along the body, and therefore their precise distance during the gluing, even though a space may be left between the ends of the body and either one of the end pieces, a space which will be filled by the glue in any event.

Important is that the space be smaller than the volume of glue initially applied in the end piece 12, 13 so that the glue is forced to creep along the bore 32, 33 when the end piece is fitted. It is also important that an enlarged space 32b, 33b be demarcated at the beginning of the gluing zone, so as to allow for a greater volume of glue in this area. Indeed, applicants have demonstrated that the most substantial stresses are located at the beginning of the gluing zone. Applicants have also demonstrated that the maximum stresses vary only slightly as a function of the length of the gluing zone, but are inversely proportional to the outer dimension (perimeter) of the gluing zone. The fact that the spoke 11 has a tubular body with a greater outer diameter than a conventional spoke makes it possible to augment substantially the gluing perimeter and, therefore, to diminish the stresses on the periphery, which provides a markedly better gluing.

When the spoke is assembled, the plugs 28, 29 prevent any glue from penetrating inside the body and, thus, ensure it is transferred by creeping on the periphery of the ends 24 and 25.

A so-called encapsulated glue can be used instead of a drop of glue applied in the bore. This is a known gluing technique, which involves coating one and/or the other of the pieces with glue containing a hardening activator enclosed in micro-capsules. Upon fitting of the end pieces, the micro-capsules rupture and release the activator. This product can be applied to the bottom of the bore or to the plug or to either one of the walls to be glued. The glue is applied to all the surfaces opposite the end piece and the tubular body once the end piece is fitted, and even slightly flow back up at the opening of the bore.

Using a tubular spoke body rather than a spoke body with a solid cross section enables a spoke to be made which, with each having a comparable weight, has more torsional and flexional strength. In addition, the gluing surface area is much larger between the body and the end piece.

By way of example, a spoke having a 3.9-millimeter diameter body and a 0.74-millimeter wall thickness, has been made in this way. The end piece 12 has a head 12b with an 8-millimeter diameter and a main portion 12a whose maximum diameter is 7 millimeters. The end piece 13 is threaded with an M7 pitch. The depth of the bore is 14 millimeters for the two end pieces. These values are, however, given by way of examples. The end piece 12, for example, can have a head built differently, for example not as wide, and can be adapted to an open-slit or button hole type of opening made in the hub and not requiring the spoke to completely engage through the hub.

FIG. 6 illustrates another mode of assembly at the end of a tubular spoke body 11. The end piece 43 shown is of the same type as the previous end piece 13, that is, with a threaded outer portion 43a. However, this construction alternative also applies to an end piece of the same type as the end piece 12 with an enlarged head.

A particular difference with the previous mode of construction is that here, the end piece 43 is glued to the outer wall and inner wall of the tubular body 11.

The inner surface 11a of the tube 11 is blocked by a plug 42 which has been inserted and force-fitted therein and which is positioned at a predeterminate distance d from the end of the body 11. The end piece 43 has a bore 44 of the same nature as the previous bore 33, with a flare or enlarged space 41 in the area of its opening. The bottom of the end piece 43 has a through opening 45. A nail 46, or other such fitting, extends within the opening. The nail has a shank 46a whose diameter is substantially equal to the inner diameter of the body 11. The shank 46a penetrates inside the inner duct 11a of the tubular body 11. The length of the shank 46a is determined so that, once in position, the end of the shank is located at a short distance from the plug, on the order of 0.5 mm. Furthermore, the nail 46 has a shouldered head 46b. Once the nail is in place, its head rests against the end surface of the opening 45.

The assembly is made according to the same procedure as explained above. First, the plug is positioned. Then, a limited amount of glue is inserted either in the tube or in the end piece, or partly in one and partly in the other. Next, the end piece 43 and the nail 46 are positioned, either simultaneously, or one after the other. The glue fills the various empty spaces between the tubular body, the plug, the end piece, and the nail. Finally, the distance between the two end pieces is adjusted with precision in order to fix the length of the spoke.

In this mode of construction, the end piece is retained by gluing to the outer wall and inner wall of the tube. As an alternative, rather than the end piece being made in two parts, i.e., with the fitting 46 providing the end piece 43 with a closed bore, within which the plug 42 is positioned, the fitting and the end piece could be made as a single piece, i.e., a unitary element with the end piece.

This mode of construction allows further augmenting the gluing surface between the end piece and the body of the spoke, since the inner and outer surfaces of the tubular body 11 are glued. The gluing perimeter is indeed augmented by at least 30%, which further increases the strength of the gluing.

Figure 7:
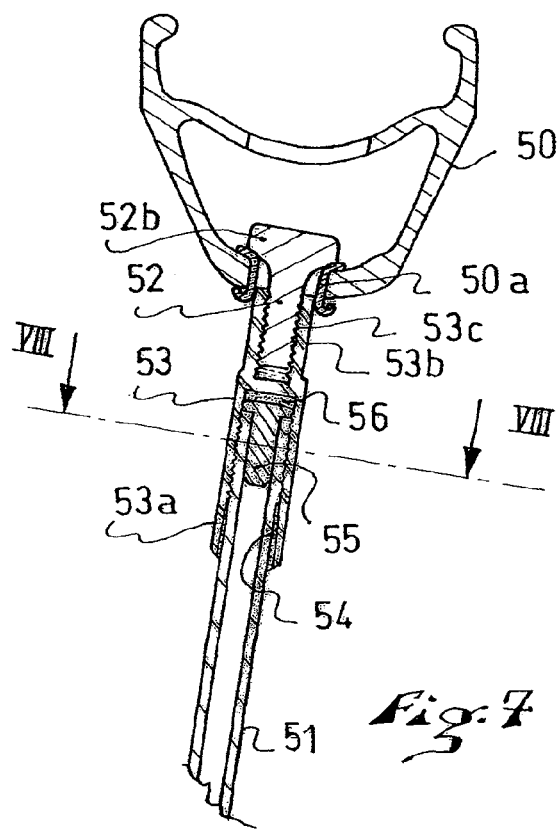
FIG. 7 shows yet another embodiment of the invention.

FIG. 7 illustrates another embodiment of the invention in which an end piece 53 is mounted at the end of a tubular spoke body 51. The end piece 53 is a fastening end piece adapted to adjust the tension of the spoke, such as the previous end pieces 43 and 13. However, instead of having a threaded end, its upper end has a threading 53c, which cooperates with a screw 52. The screw head 52b is housed in the box of the rim 50 and is retained in the area of a housing 50a of the lower bridge through which the screw extends. The screw head 52b is accessible from the outside of the rim through a piercing in the upper bridge of the rim.

The end piece 53 has a first portion 53a with a bore 54 of the same nature as the bore 33 described above 33. This first portion is prolonged by a second portion 53b, which has a housing 53c threaded with the pitch of the thread of the screw 52. The bore 54 of the first portion is recessed to retain the glue in this area.

As described above, the end of the body 51 is blocked with a plug 55, which prevents the glue 56 from penetrating inside the tube while the end piece is being fitted. Thus, the glue spreads between the tubular body and the end piece and ensures the assembly between the two elements.

The other end piece is, for example, similar to the end piece 12 which has been described above. To adjust the tension of the spoke, the screw 52 is more or less screwed in the threaded housing of the end piece. Contrary to the first spoke described, the tension can be adjusted without the spoke body rotating about itself.

Figure 8:
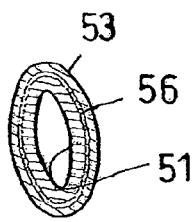
FIG. 8 is a transverse cross-sectional view along the line VIII-VIII of the spoke body of FIG. 7 in the area of the end piece, the spoke being attached to a rim.
Figure 9:
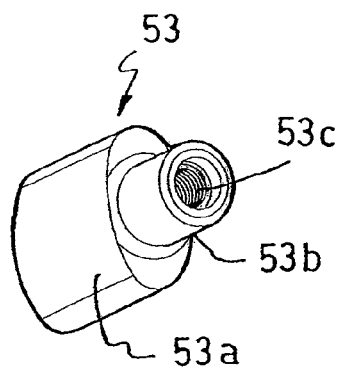
FIG. 9 is a perspective view of the end piece of FIG. 7.

FIGS. 8 and 9 illustrate an alternative embodiment. Instead of a circular cross section, the spoke body 51 has an elongated cross section, which, here, is an elliptical section, for example. A manufacturer may opt for a cross section of this type to meet requirements of aerodynamics, for example. Other cross sections are also possible within the scope of the invention. For example, a water drop-shaped cross section could be utilized. It could be advantageous, for example, to keep the tubular character of the spoke body for reasons related to rigidity and lightness. Thus, the cross section of FIG. 8 shows the body 51 on the inside, the wall of the end piece 53 on the outside, and the layer of glue 56 between the two.

FIG. 9 shows the end piece 53 with its first portion 53a provided with the bore, and its second portion 53b provided with the threaded housing 53c. The second portion 53b has a circular cross section provided with a threading 53c to house a screw 52 provided with a head 52b. The first portion 53a has an elliptical cross section, which closely fits the elongated cross section of the spoke body.

Figure 10:
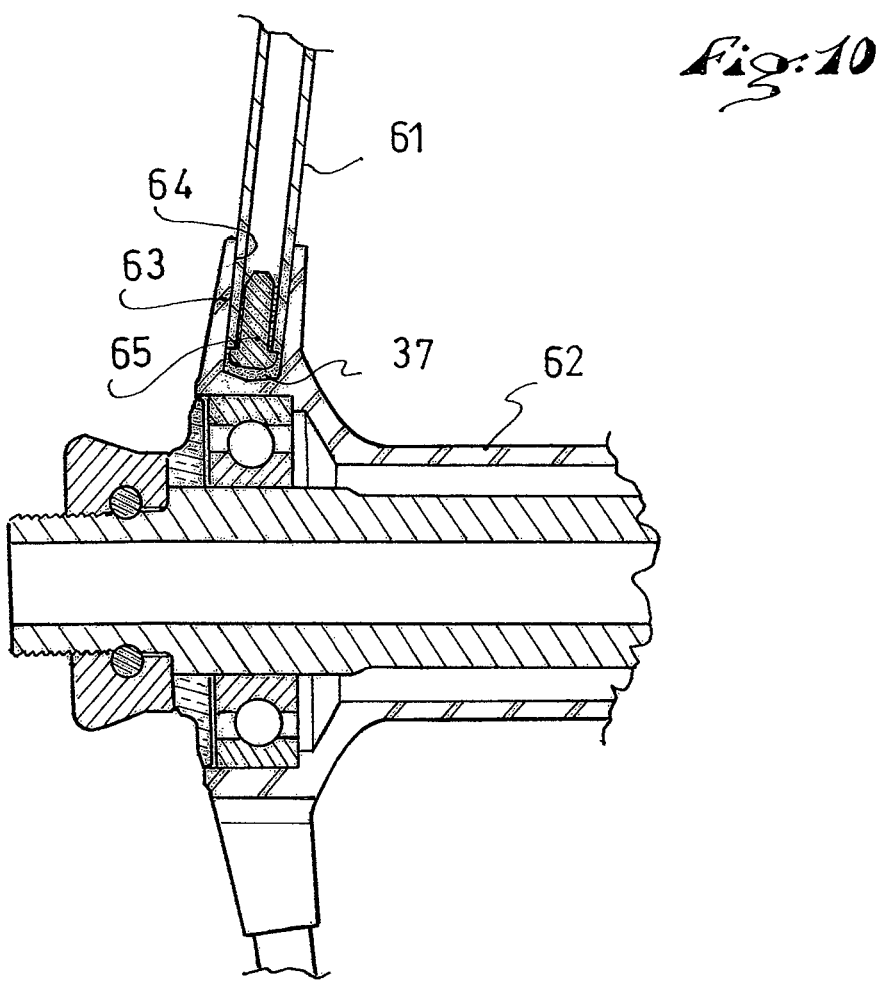
FIG. 10 illustrates an alternative embodiment of the invention, showing an end of the spoke attached to a hub.

FIG. 10 illustrates an alternative construction. Instead of being provided with a retaining end piece such as the end piece 12, which has been described above, the end of the spoke body 61 is directly fitted in a housing of the hub body. For example, as illustrated, the hub body 62 has arms 63 directed along the longitudinal direction of each spoke. The arms are pierced with a bore 64. As described above, a plug 65 blocks the end of the tube and the spoke body 61 is affixed to the hub body by means of a layer of glue 37 which fills the space between the walls of the bore and the tubular body. In a particular embodiment, the hub body is made of aluminum alloy so as to be able to be adequately glued to the composite material of the spoke body.

For such a mode of construction, one will consider that, for a spoke, the end piece located on the side of the hub body is formed by the arm 63 of the hub.

As has been described above, striae or any other appropriate means can be provided to facilitate the transfer of the glue.

However, the hub body could be made of a composite material. In such a case, the spokes could be made as a unitary with the hub body, or to make the spokes of one side of the wheel as a unitary element, which would form a star shape, or star-like shape. In such a case, because the spoke could no longer rotate around itself, a head on the rim side similar to that of FIG. 7 could be selected to allow for tensioning the spokes.

Thus, using a tubular spoke body made of a composite material assembled to at least one attached end piece makes it possible to manufacture a light spoke having flexional and tension strength, and, if necessary, an aerodynamic profile, which makes it possible to build a light and fatigue-resistant wheel.

The foregoing description is only given by way of non-limiting example, and other embodiments of the invention are possible without leaving the scope of the invention.

In particular, the tubular spokes according to the invention can work in traction tension and are also sufficiently buckling-resistant to be able to work in compression, such as disclosed in FR 2 900 869, the disclosure of which is hereby incorporated by reference thereto in its entirety.

In addition, a mechanical structural detail other than the striae could also be provided to facilitate the glue transfer and improve the mechanical fastening between the bore of the end piece or of the hub body and the spoke body.

As for the wheel, it can be built using either all of the spokes made as described, or only part of them, for example on one side of the rim, the other side being made of spokes with a different structure.

Bent retaining end pieces or retaining end pieces provided with a retaining device on the hub, which is off-centered with respect to the longitudinal axis of the body, can also be used.

One could also use, on each side of the spoke, end pieces provided with reversed threading (i.e., 1 right, 1 left) so that screwing the first causes the tensioning of the spoke. Such a construction prevents the spoke from being inserted in the inside of the hub.

The invention claimed is:

1. A spoke for a spoked wheel, said spoke comprising:
   an elongated body having a first end and a second end;
   an attached end piece at at least one of said first and second ends of said elongated body;
   the elongated body being tubular and said one of said first and second ends being fitted in a closed bore of said attached end piece.

2. A spoke according to claim 1, further comprising:
   a plug blocking said one of said first and second ends of the tubular elongated body.

3. A spoke according to claim 1, wherein:
said attached end piece is assembled to said one of said first and second ends of the tubular body by glue.

4. A spoke according to claim 1, wherein:
a bottom of said attached end piece includes an opening traversed by a nail;
said nail has a shank extending within the elongated tubular body; and
said nail has a head resting against the bottom on one side of the opening.

5. A spoke according to claim 4, wherein:
on one side of the opening, the bore of the end piece has an enlarged inlet portion.

6. A spoke according to claim 1, wherein:
at least one of said first and second ends of the tubular body is provided with irregularities or striae.

7. A spoke according to claim 1, wherein:
the bore of the attached end piece has a wall provided with irregularities or striae over at least a portion of a length of the wall.

8. A spoke according to claim 7, wherein:
the wall of the bore of the attached end piece is provided with helical and continuous striae.

9. A spoke according to claim 1, wherein:
the attached end piece has a threaded end.

10. A spoke according to claim 1, wherein:
the attached end piece has a section with a threaded housing.

11. A spoke according to claim 1, wherein:
the attached end piece has a head with an enlarged section.

12. A spoke according to claim 1, wherein:
the spoke body is made of a composite material and said attached end piece is made of aluminum alloy.

13. A spoked wheel comprising:
a central hub;
a peripheral rim;
spokes connecting the rim to the hub;
at least one of said spokes comprises:
an elongated body having a first end and a second end;
an attached end piece at at least one of said first and second ends of said elongated body;
the elongated body being tubular and said one of said first and second ends being fitted in a closed bore of said attached end piece.

14. A wheel according to claim 13, wherein:
the hub has a hub body mounted for rotation around a shaft;
the hub has at least one end having arms oriented along a direction of each of said spokes, each of the arms having a bore, and the spoke body of each of the spokes being fitted in the bore of a respective one of the arms.

15. A method for manufacturing a spoke of a spoked wheel, said spoke having a tubular body and at least one end piece having a bore, said method comprising:
blocking an end of the tubular body of the spoke with a plug;
applying glue to the bore of the end piece and/or to an end of the tubular body;
assembling said one end piece to the end of the tubular body by fitting the bore of the end piece onto the end of the tubular body.

16. A method according to claim 15, further comprising:
adjusting a length of the spoke by adjusting a position of the end piece at the end of the tubular body.

17. A spoke according to claim 1, wherein:
said elongated tubular body has an outer diameter greater than 2 millimeters.

18. A spoke according to claim 1, wherein:
said elongated tubular body has an outer diameter of 4 millimeters.

19. A spoke according to claim 2, wherein:
said attached end piece has a closed interior cavity; and
said plug has an outer end contained within said cavity.

20. A spoke according to claim 9, wherein:
said threaded end comprises external threads, said externally threaded end comprising means for adjusting longitudinal tension in the spoke when the spoke is connected between a hub and a rim.

21. A wheel according to claim 13, wherein:
said elongated tubular body of said at least one of said spokes has an outer diameter greater than 2 millimeters.

22. A wheel according to claim 13, wherein:
said elongated tubular body of said at least one of said spokes has an outer diameter of 4 millimeters.

23. A wheel according to claim 13, further comprising:
a plug blocking said one of said first and second ends of the elongated tubular body of said at least one of said spokes;
said attached end piece having a closed interior cavity; and
said plug having a radially outermost end contained within said cavity.

24. A wheel according to claim 13, wherein:
said attached end piece has external threads, said external threads comprising means for adjusting longitudinal tension in the spoke when the spoke is connected between the rim and the hub.

25. A method according to claim 15, wherein:
said elongated tubular body of said spoke has an outer diameter greater than 2 millimeters.

26. A method according to claim 15, wherein:
said elongated tubular body of said spoke has an outer diameter of 4 millimeters.

27. A method according to claim 15, wherein:
said attached end piece has a closed interior cavity; and
said plug has an outer end contained within said cavity.

28. A method according to claim 15, further comprising:
attaching the spoke to the wheel between a hub and a rim of the wheel; and
tensioning the spoke when attached between the hub and the rim of the wheel.

29. A tension spoke for a spoked cycle wheel, said spoke comprising:
an elongated tubular body having a first end portion and a second end portion, each of first and second portions having an outer cross-sectional width;
an end piece extending around and being fitted over the first end portion of the elongated tubular body, said end piece having an outer surface structured and arranged to be connected to a rim or a hub of the cycle wheel;
said end piece having an interior cavity with a closed end;
a plug blocking the first end portion of the elongated tubular body;
said plug having an outer end contained within said cavity.

30. A spoke according to claim 29, wherein:
an additional end piece extending around and being fitted onto the second end portion of the elongated tubular body, said additional end piece having an outer surface structured and arranged to be connected to a rim or a hub of the cycle wheel;
said additional end piece having an interior cavity with a closed end;
a plug blocking the second end portion of the elongated tubular body;
said plug having an outer end contained within said cavity.

31. A spoke according to claim 29, wherein:
at least said first end portion of said elongated body has an outer diameter of 4 millimeters.

32. A spoke according to claim 29, wherein:
at least said first end portion of said elongated body has an inner diameter of 3.0 millimeters or more.

33. A spoke according to claim 29, wherein:
said end piece has a threaded outer surface for connecting the spoke to a rim or a hub of the cycle wheel.

34. A spoke according to claim 29, wherein:
said end piece is glued to the first end portion of the elongated tubular body.

35. A spoke according to claim 29, wherein:
said elongated tubular body comprises fiber-reinforced resin.

\* \* \* \* \*